(12) United States Patent
Kuang

(10) Patent No.: US 12,368,344 B2
(45) Date of Patent: Jul. 22, 2025

(54) GENERATOR ASSEMBLY

(71) Applicant: Guilong He, Guangdong (CN)

(72) Inventor: Weixin Kuang, Guangdong (CN)

(*) Notice: Subject to any disclaimer, the term of this patent is extended or adjusted under 35 U.S.C. 154(b) by 513 days.

(21) Appl. No.: 17/909,361

(22) PCT Filed: Jan. 12, 2021

(86) PCT No.: PCT/CN2021/071274
§ 371 (c)(1),
(2) Date: Sep. 3, 2022

(87) PCT Pub. No.: WO2021/175015
PCT Pub. Date: Sep. 10, 2021

(65) Prior Publication Data
US 2023/0078616 A1 Mar. 16, 2023

(30) Foreign Application Priority Data
Mar. 6, 2020 (CN) .......................... 202020265510.2

(51) Int. Cl.
*H02K 3/50* (2006.01)
*H02K 7/08* (2006.01)
*H02K 7/18* (2006.01)

(52) U.S. Cl.
CPC ............. *H02K 7/1807* (2013.01); *H02K 3/50* (2013.01); *H02K 7/083* (2013.01); *H02K 2203/03* (2013.01); *H02K 2203/06* (2013.01)

(58) Field of Classification Search
CPC .... H02K 21/227; H02K 21/125; H02K 21/24; H02K 3/50; H02K 7/1823; H02K 7/1807; H02K 7/083; H02K 11/33; H02K 2203/03; H02K 2203/06; H02K 1/12; H02K 1/145; B62J 6/12
(Continued)

(56) References Cited

U.S. PATENT DOCUMENTS

2010/0123371 A1* 5/2010 Lin ...................... H02K 21/227
310/67 A

FOREIGN PATENT DOCUMENTS

CN 03220267 * 3/2004

OTHER PUBLICATIONS

Chen Dingxing, In the Wheel Hub of the Acceleration Generator, Mar. 31, 2004, CN 2608311 (English Machine Translation) (Year: 2004).*

* cited by examiner

*Primary Examiner* — Alexander A Singh
(74) *Attorney, Agent, or Firm* — Ying-Ting Chen; Law Office of Michael Chen

(57) ABSTRACT

A generator assembly includes a screw rod, a shell and a multi-polar magnetic ring, wherein a first inner hub is installed in the shell, a protection ring is sleeved on the outside of the multi-polar magnetic ring, a stator rubber-coated power generation coil set is installed in the multi-polar magnetic ring, the screw rod passes through the first inner hub, the multi-polar magnetic ring, the protection ring, the stator rubber-coated power generation coil set and a second inner wheel hub in sequence, and the stator rubber-coated power generation coil set includes a first dentiform outer iron shell, a single-strand winding coil set, a second dentiform outer iron shell and a circuit board. Moreover, the single-strand winding coil set is used, and cutting power generation is performed by using the inner and outer dentiform motor shells, therefore the processing of the coil and the motor shells move simply.

5 Claims, 2 Drawing Sheets

(58) Field of Classification Search
USPC .......................................................... 310/71
See application file for complete search history.

GENERATOR ASSEMBLY

TECHNICAL FIELD

The utility model relates to the field of generators, and in particular to a generator assembly.

BACKGROUND ART

A generator refers to a mechanical equipment that converts other forms of energy into electrical energy. The mechanical equipment is driven by a water turbine, a steam turbine, a diesel engine or other power machines, converts water flow, airflow, energy generated by fuel combustion or nuclear fission into mechanical energy, and transmits the same to the generator, and then the generator converts the mechanical energy into electrical energy. Generators are widely used in industrial and agricultural production, national defense, science and technology and daily lives.

There are many types of generators, and a rotating generator is one of the common types. An existing rotating generator is composed of multi-strand coils and multi-polar magnetic rings. Due to the complex processing and high production costs of multiple groups of coils, the cost of the rotating generator is high, and the maximum number of the multi-polar magnetic rings is 10 poles, such that the power generation efficiency is low.

SUMMARY OF THE UTILITY MODEL

The purpose of embodiments of the present utility model is to provide a generator assembly, so as to solve the problems raised in the above background art.

In order to achieve the above purpose, an embodiment of the present utility model provides the following technical solutions:

A generator assembly, including a screw rod, a shell, a multi-polar magnetic ring and a nut, wherein a first inner hub is installed in the shell, a protection ring is sleeved on the outside of the multi-polar magnetic ring, a stator rubber-coated power generation coil set is installed in the multi-polar magnetic ring, the screw rod passes through the first inner hub, the multi-polar magnetic ring, the protection ring, the stator rubber-coated power generation coil set and a second inner wheel hub in sequence, and is fastened with the nut, a power lead-out wire is installed on the stator rubber-coated power generation coil set, the stator rubber-coated power generation coil set includes a first dentiform outer iron shell, a single-strand winding coil set, a second dentiform outer iron shell and a circuit board, the circuit board is connected to the power lead-out wire, both the single-strand winding coil set and the circuit board are installed in a closed structure formed by the first dentiform outer iron shell and the second dentiform outer iron shell, the first dentiform outer iron shell and the second dentiform outer iron shell are cutting surfaces and are arranged on the outside, when the first inner hub and the second inner hub rotate, the multi-polar magnetic ring rubs against the stator rubber-coated power generation coil set to cut a magnetic field, so as to generate a power source, the protection ring can protect the multi-polar magnetic ring from breaking due to the collision of the first inner hub and the second inner hub during the rotation process, the power lead-out wire is connected to the circuit board, the stator rubber-coated power generation coil set and the power lead-out wire are fixed, and other accessories are installed at last. In the prior art, since a change is made to wrap the multi-polar magnetic ring around the stator rubber-coated power generation coil set, the number of positive and negative electrodes of the first dentiform outer iron shell and the second dentiform outer iron shell can be set to be 24, 36 or more. Furthermore, once magnetic field cutting is completed as long as the multi-polar magnetic ring rotates slightly, thereby greatly improving the power generation efficiency.

As a further solution of the embodiment of the present utility model: the circuit board is a PCB, which is easily available in the market and has a good use effect.

As a further solution of the embodiment of the present utility model: the screw rod is fixed with the first inner hub by means of the cooperation of a first gasket and a first bearing, and the screw rod is fixed with the second inner hub by means of the cooperation of a second gasket and a second bearing. Therefore, the connection is firm and is not easy to fall off.

As a further solution of the embodiment of the present utility model: the power lead-out wire and the stator rubber-coated power generation coil set are fixed on the circuit board by a stator top cylinder, so as to ensure normal power generation.

As a further solution of the embodiment of the present utility model: the screw rod is a D-type screw rod, which is easily available in the market, is convenient for installation and disassembly, and has a good use effect.

Compared with prior art, the embodiment of the present utility model has the beneficial effects as follows:

In the present product, the original multi-strand coil cutting power generation structure is changed into the single-strand winding coil set, and cutting power generation is performed by using the inner and outer dentiform motor shells, therefore the processing of the coil and the motor shells is move convenient and simple. Moreover, the cutting polarity is changed from the original maximum number of tens of polarities to 24, 36 or more, thereby greatly improving the efficiency of the generator. Accordingly, the present product can be widely used in wheel self-power generation, wind power generation and hydropower generation, and the application range is thus wider.

Figure 1:
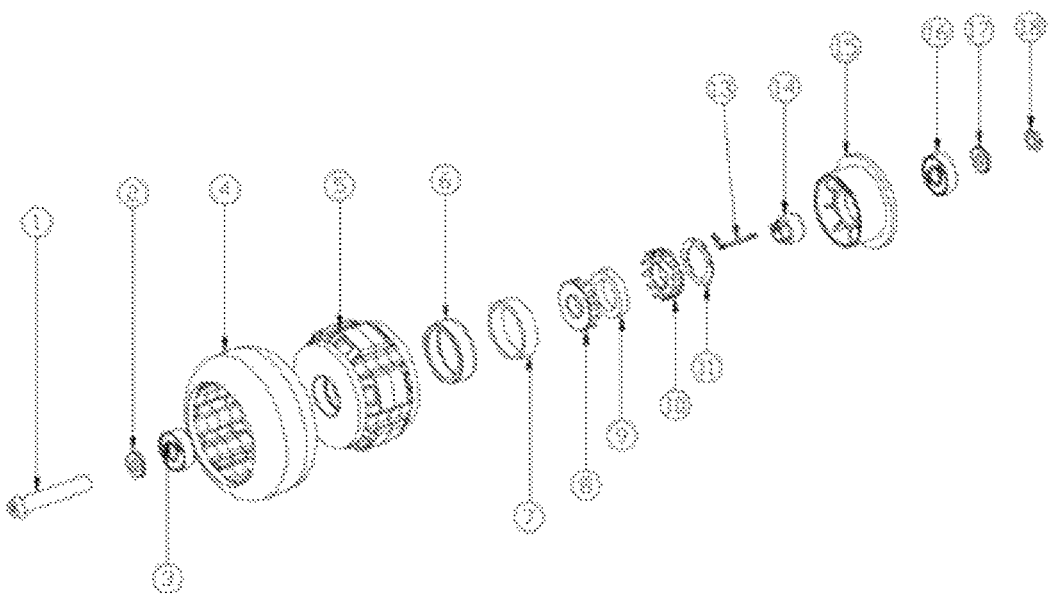
FIG. 1 is an exploded view of a generator assembly.
Figure 2:
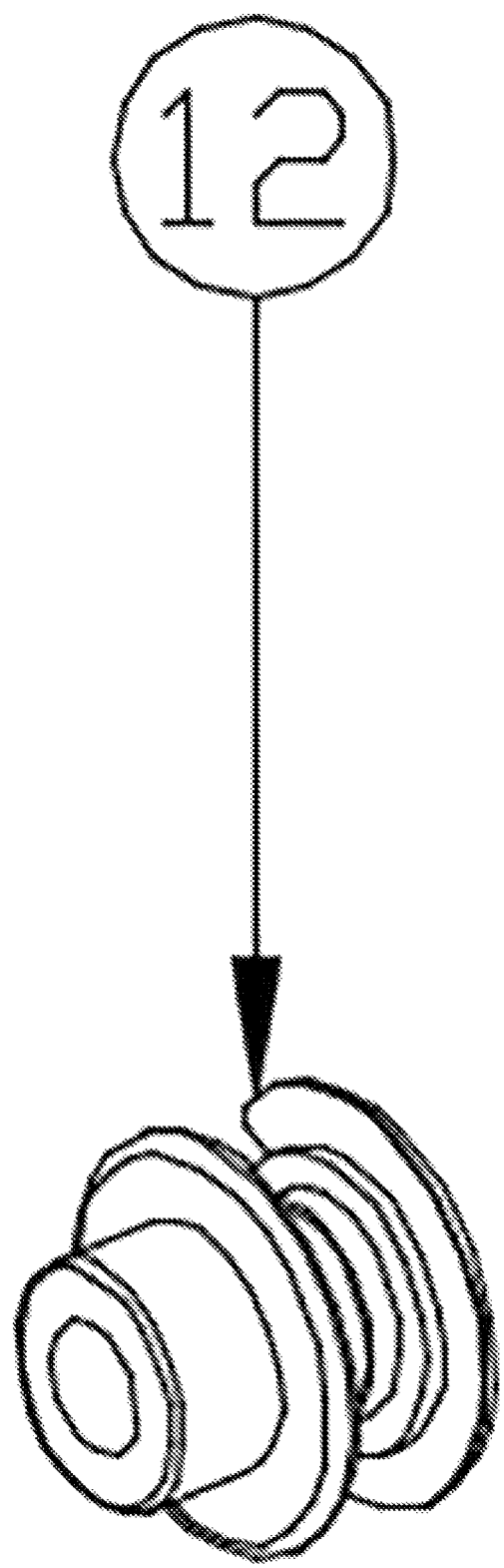
FIG. 2 is a schematic structural diagram of a stator rubber-coated power generation coil set in the generator assembly.

1-screw, 2-first gasket, 3-first bearing, 4-outer shell, 5-first inner hub, 6-protection ring, 7-multi-polar magnetic ring, 8-first dentiform outer iron shell, 9-single-strand winding coil set, 10-second dentiform outer iron shell, 11-circuit board, 12-stator rubber-coated power generation coil set, 13-power lead-out wire, 14-stator top cylinder, 15-second inner hub, 16-second bearing, 17-second gasket, 18-nut.

DETAILED DESCRIPTION OF THE EMBODIMENTS

The technical solution of the present patent will be described in further detail below in conjunction with specific embodiments.

Embodiment 1

A generator assembly, including a screw 1, a shell 4, a multi-polar magnetic ring 7 and a nut 18, wherein a first inner hub 5 is installed in the shell 4, a protection ring 6 is sleeved on the outside of the multi-polar magnetic ring 7, a stator rubber-coated power generation coil set 12 is installed in the multi-polar magnetic ring 7, the screw rod 1 passes through the first inner hub 5, the multi-polar magnetic ring 7, the protection ring 6, the stator rubber-coated power generation coil set 12 and a second inner wheel hub 15 in sequence, and is fastened with the nut 18, a power lead-out wire 13 is installed on the stator rubber-coated power generation coil set 12, the stator rubber-coated power generation coil set 12 includes a first dentiform outer iron shell 8, a single-strand winding coil set 9, a second dentiform outer iron shell 10 and a circuit board 11, the circuit board 11 is connected to the power lead-out wire 13, both the single-strand winding coil set 9 and the circuit board 11 are installed in a closed structure formed by the first dentiform outer iron shell 8 and the second dentiform outer iron shell 10, the first dentiform outer iron shell 8 and the second dentiform outer iron shell 10 are cutting surfaces and are arranged on the outside, when the first inner hub 5 and the second inner hub 15 rotate, the multi-polar magnetic ring 7 rubs against the stator rubber-coated power generation coil set 12 to cut a magnetic field, so as to generate a power source, the protection ring 6 can protect the multi-polar magnetic ring 7 from breaking due to the collision of the first inner hub 5 and the second inner hub 15 during the rotation process, the power lead-out wire 13 is connected to the circuit board 11, the stator rubber-coated power generation coil set 12 and the power lead-out wire 13 are fixed, and other accessories are installed at last. In the prior art, since a change is made to wrap the multi-polar magnetic ring 7 around the stator rubber-coated power generation coil set 12, the number of positive and negative electrodes of the first dentiform outer iron shell 8 and the second dentiform outer iron shell 10 can be set to be 24, 36 or more. Furthermore, once magnetic field cutting is completed as long as the multi-polar magnetic ring 7 rotates slightly, thereby greatly improving the power generation efficiency.

To ensure the use effect, the circuit board 11 is a PCB, which is easily available in the market and has a good use effect.

Further, the screw rod 1 is fixed with the first inner hub 5 by means of the cooperation of a first gasket 2 and a first bearing 3, and the screw rod 1 is fixed with the second inner hub 15 by means of the cooperation of a second gasket 17 and a second bearing 16. Therefore, the connection is firm and is not easy to fall off.

Embodiment 2

A generator assembly, including a screw 1, a shell 4, a multi-polar magnetic ring 7 and a nut 18, wherein a first inner hub 5 is installed in the shell 4, a protection ring 6 is sleeved on the outside of the multi-polar magnetic ring 7, a stator rubber-coated power generation coil set 12 is installed in the multi-polar magnetic ring 7, the screw rod 1 passes through the first inner hub 5, the multi-polar magnetic ring 7, the protection ring 6, the stator rubber-coated power generation coil set 12 and a second inner wheel hub 15 in sequence, and is fastened with the nut 18, a power lead-out wire 13 is installed on the stator rubber-coated power generation coil set 12, the stator rubber-coated power generation coil set 12 includes a first dentiform outer iron shell 8, a single-strand winding coil set 9, a second dentiform outer iron shell 10 and a circuit board 11, the circuit board 11 is connected to the power lead-out wire 13, both the single-strand winding coil set 9 and the circuit board 11 are installed in a closed structure formed by the first dentiform outer iron shell 8 and the second dentiform outer iron shell 10, the first dentiform outer iron shell 8 and the second dentiform outer iron shell 10 are cutting surfaces and are arranged on the outside, when the first inner hub 5 and the second inner hub 15 rotate, the multi-polar magnetic ring 7 rubs against the stator rubber-coated power generation coil set 12 to cut a magnetic field, so as to generate a power source, the protection ring 6 can protect the multi-polar magnetic ring 7 from breaking due to the collision of the first inner hub 5 and the second inner hub 15 during the rotation process, the power lead-out wire 13 is connected to the circuit board 11, the stator rubber-coated power generation coil set 12 and the power lead-out wire 13 are fixed, and other accessories are installed at last. In the prior art, since a change is made to wrap the multi-polar magnetic ring 7 around the stator rubber-coated power generation coil set 12, the number of positive and negative electrodes of the first dentiform outer iron shell 8 and the second dentiform outer iron shell 10 can be set to be 24, 36 or more. Furthermore, once magnetic field cutting is completed as long as the multi-polar magnetic ring 7 rotates slightly, thereby greatly improving the power generation efficiency.

In order to ensure normal power generation, the power lead-out wire 13 and the stator rubber-coated power generation coil set 12 are fixed on the circuit board 11 by a stator top cylinder 14.

Further, the screw rod 1 is a D-type screw rod, which is easily available in the market, is convenient for installation and disassembly, and has a good use effect.

The above descriptions are only preferred embodiments of the present utility model, and are not intended to limit the present utility model. Any modifications, equivalent replacements, improvements and the like, made within the spirit and principles of the present utility model, shall all fall within the protection scope of the present utility model. Any reference sign in the claims shall not be construed as limiting the involved claims.

In addition, it should be understood that, although the specification is described according to the embodiments, not every embodiment only includes an independent technical solution, and this narration manner of the specification is only for the sake of clarity, and those skilled in the art should take the specification as a whole, and the technical solutions in various embodiments can also be appropriately combined to form other embodiments that can be understood by those skilled in the art.

The invention claimed is:

1. A generator assembly, comprising a screw rod (1), a shell (4), a multi-polar magnetic ring (7) and a nut (18), wherein a first inner hub (5) is installed in the shell (4), a protection ring (6) is sleeved on the outside of the multi-polar magnetic ring (7), a stator rubber-coated power generation coil set (12) is installed in the multi-polar magnetic ring (7), the screw rod (1) passes through the first inner hub (5), the multi-polar magnetic ring (7), the protection ring (6), the stator rubber-coated power generation coil set (12) and a second inner wheel hub (15) in sequence, and is fastened with the nut (18), a power lead-out wire (13) is installed on the stator rubber-coated power generation coil set (12), the stator rubber-coated power generation coil set (12) comprises a first dentiform outer iron shell (8), a single-strand winding coil set (9), a second dentiform outer iron shell (10) and a circuit board (11), the circuit board (11) is connected to the power lead-out wire (13), and both the single-strand winding coil set (9) and the circuit board (11) are installed in a closed structure formed by the first dentiform outer iron shell (8) and the second dentiform outer iron shell (10).

2. The generator assembly according to claim 1, wherein the circuit board (11) is a PCB.

3. The generator assembly according to claim 1, wherein the screw rod (1) is fixed with the first inner hub (5) by means of the cooperation of a first gasket (2) and a first bearing (3), and the screw rod (1) is fixed with the second inner hub (15) by means of the cooperation of a second gasket (17) and a second bearing (16).

4. The generator assembly according to claim 1, wherein the power lead-out wire (13) and the stator rubber-coated power generation coil set (12) are fixed on the circuit board (11) by a stator top cylinder (14).

5. The generator assembly according to claim 1, wherein the screw rod (1) is a D-type screw rod.

\* \* \* \* \*